United States Patent [19]

Prakken

[11] 4,398,383
[45] Aug. 16, 1983

[54] APPARATUS FOR PACKAGING PRODUCT FILLED SEALED BAGS INTO CASES

[75] Inventor: Bouwe Prakken, Kamerik, Netherlands

[73] Assignee: Allen Fruit Co., Inc., Newberg, Oreg.

[21] Appl. No.: 233,041

[22] Filed: Feb. 10, 1981

[30] Foreign Application Priority Data

Mar. 12, 1980 [NL] Netherlands .......................... 8001469

[51] Int. Cl.³ ...................... B65B 35/32; B65B 35/40; B65B 35/44
[52] U.S. Cl. ........................................ 53/537; 53/542; 53/543; 53/247
[58] Field of Search ................. 53/537, 539, 542, 543, 53/247, 258, 260

[56] References Cited

U.S. PATENT DOCUMENTS

| 2,857,721 | 10/1958 | Ardell et al. ...................... 53/537 X |
| 3,608,269 | 9/1971 | Gore ................................. 53/542 X |
| 3,641,735 | 2/1972 | Daily et al. .......................... 53/537 |
| 3,657,860 | 4/1972 | Franklin ............................. 53/537 X |
| 3,766,706 | 10/1973 | Graham ............................. 53/260 X |
| 3,822,528 | 7/1974 | Carlsson et al. ...................... 53/542 |
| 3,902,587 | 9/1975 | Checcucci ......................... 53/537 X |
| 4,162,870 | 7/1979 | Storm ............................... 53/542 X |
| 4,215,523 | 8/1980 | Turner .............................. 53/260 X |

Primary Examiner—Horace M. Culver
Attorney, Agent, or Firm—Klarquist, Sparkman, Campbell, Leigh, Whinston & Dellett

[57] ABSTRACT

An apparatus for packaging product-filled sealed bags in cases includes an inclined plate and an extensible pushing plate operable to arrange a predetermined number of bags fed from an infeed conveyor in a row on the inclined plate. The row is supported thereon by a movable support pivotable from a holding or supporting position to a retracted position in which the row is free to slide downwardly off the inclined plate and onto a retractable bottom plate. The movable support further operates to position each row formed in an upright position on the bottom plate, where a predetermined number of rows are successively accumulated. The accumulated rows are laterally supported on one side by the movable support and on the other side by a cylinder having a supporting back plate at the end. When a predetermined number of rows have been accumulated, the bottom plate is retracted to allow a cylinder-operated pushing plate to push the rows downwardly into an underlying open case.

7 Claims, 7 Drawing Figures

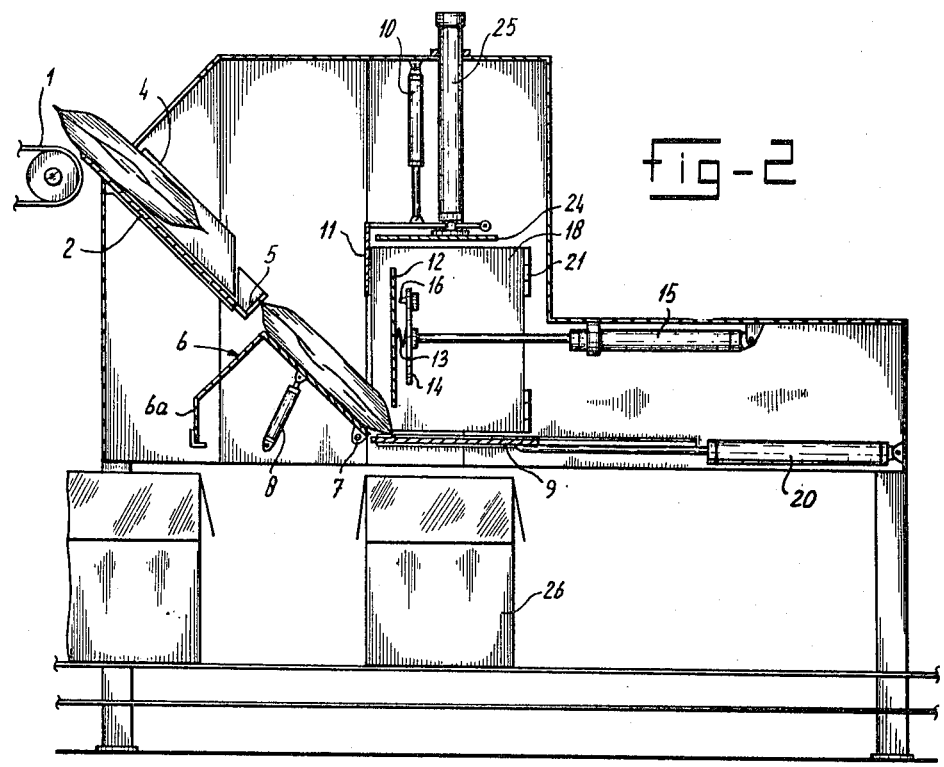
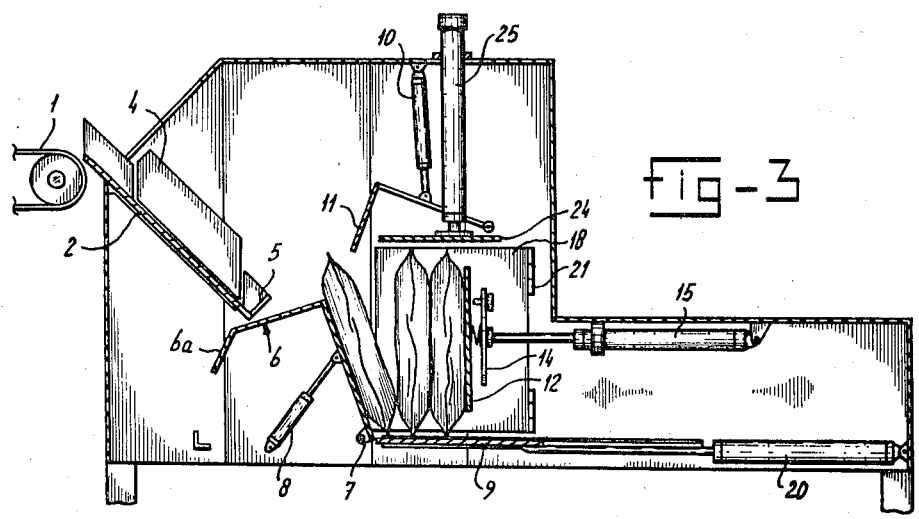

APPARATUS FOR PACKAGING PRODUCT FILLED SEALED BAGS INTO CASES

The invention relates to an apparatus for packaging product filled sealed bags into cases, said bags being in an upward position.

In known packaging machines for filling cases with sealed product filled bags, the bags are introduced into the cases in a lying position. There is more chance of introducing damaged bags into the cases than if the bags would be introduced in an upward position into the cases. However, the filling of cases with upward standing bags will attend with the problem that at the collecting of the bags into rows and layers and the transfering of such layers into a case, the bags must be prevented from tilting.

The object of the present invention is to provide a packaging machine by which the bags may be introduced into a case in an upward standing position, while the tilting problem is completely solved.

Another object of the invention is to provide a machine for packaging product filled sealed bags into cases, wherein the number of bags per row, the numbers of rows per layer, and the numbers of layers per case are separately adjustable.

Another object of the invention is to provide a packaging machine of the above type, in which the collecting of the bags into layers of a certain number of rows takes place above the level where the cases to be filled are supplied and the filled cases are taken away.

Another object of the invention is to provide a machine for packaging product filled sealed bags into cases, wherein deformable, compressable properties of the sealed bags are used to lock up a layer of bags entirely and to transfer this layer in to a case.

According to the invention the apparatus mentioned in the preamble is therefore provided with means for arranging a previously determined number of upstanding bags into a row on a movable support, means for moving the support to a non-supporting position when the row of bags has been formed on the support, a bottom plate for successively receiving the rows of bags, means for pulling away the bottom plate if a layer consisting of a certain number of rows has been collected on that bottom plate, means for lock up the layer of bags when the bottom plate is pulled away and means to push downwards the layer of bags into a case.

An advantageous embodiment of the above apparatus comprises a storage means inclined in the transverse direction, on which the bags are laid in a row, an erector movable between a holding position in which the bags are holded on the storage means and a sliding position in which a row of bags may slide from the storage means, a back plate opposite to the erector and meant to prevent the bags supported on the bottom plate from tilting in the direction of the erector, a holding member above the bottom plate, said member being movable between a position in which the bags in a vertical position are prevented from tilting towards the erector being in the sliding position and a retracted position, and means for moving the back plate stepwise from the erector along substantially the thickness dimension of a bag.

To lock up a layer of bags at four sides, sideplates may be present at both sides of the bottom plate, said side plates extending substantially transverse to the back plate and being movable to each other and from each other.

The stepwise retracting of the back plate when the rows of bags slide on the bottom plate, can take place in a simple way if the back plate is actuated by a pneumatic or hydraulic piston-cylinder assembly, wherein between the back plate and the end of the piston rod a spring is mounted which when contacting the back plate, may give an actuating signal to move the piston rod along a length corresponding substantially to the thickness of a bag.

In an alternative embodiment the means for arranging a certain number of bags into a row comprises at least one horizontal endless chain provided with vertical carrier plates.

The invention will be elucidated now with the aid of two embodiments shown in the figures.

FIG. 2 shows a corresponding vertical cross-section however, in a position in which a row is moved towards a bottom plate.

FIG. 3 shows a corresponding vertical cross-section during the collecting of the rows to form a layer.

Figure 1:
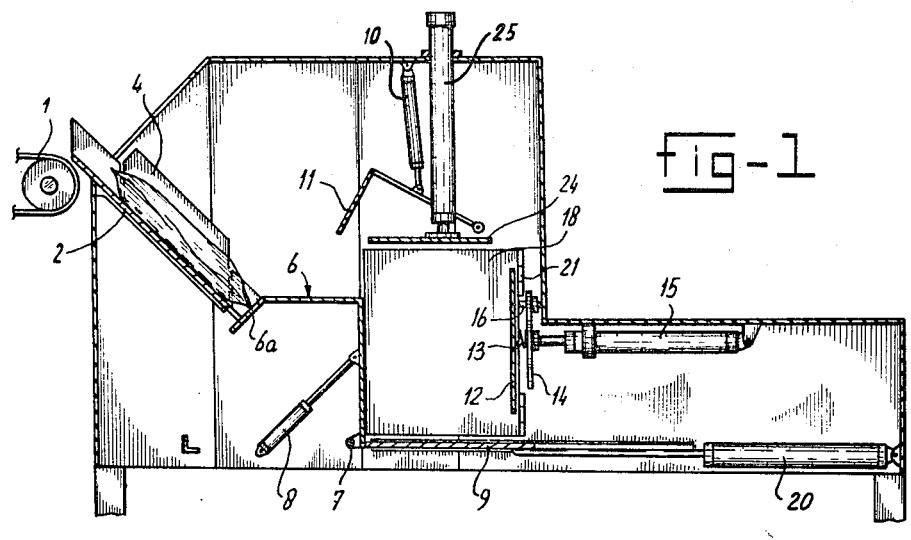
FIG. 1 shows a vertical cross-section according to line I—I in FIG. 5, the machine being shown in the position in which the bags are collected into a row.

The apparatus shown in the figures is destined to fill cases or boxes with one or more layers of upstanding bags filled with some product, such as chips, and sealed in an air-tight manner. Successively a number of bags is arranged to form a row. A number of rows is collected to form a layer and a layer is pushed into a case. The actuating system consisting of lines and valves and controlling and signaling members has not been shown since the construction of such a system is obvious for an expert.

To arrange the bags supplied by a conveyor 1, to form a row, the machine comprises a storage plate 2 which is horizontal in its longitudinal direction and inclined in its transverse direction. Further a pushing plate 4 is used, said plate being coupled to a pneumatic cylinder 3. At the place where the conveyor 1 supplies the bags on the plate 2, a fixed holding edge 5 is mounted.

As soon a bag arrives on plate 2, it is pushed forwards along the width dimension of a bag by means of the pushing plate 4. Bags being not in contact wth the fixed holding edge 5 and lying on the inclined plate 2, are holded by an edge 6a of an erector 6 pivotable about an axis 7 by means of a pneumatic cylinder 8 between the supporting position of FIG. 1 in which the edge 6a lies in line with the fixed holding edge 5, and the sliding position of FIG. 2 in which a row of bags collected on plate 2 may slide along the erector 6 towards a bottom plate 9.

The number of times the cylinder 3 and pushing plate 4 has moved a bag on the inclined plate 2 is counted by a counting mechanism known per se. As soon as a previously determined number of bags has been collected on plate 2, an actuating signal is given to the cylinder 8 to pivot the erector 6 to the position of FIG. 2. The row of bags (in the drawing consisting of four bags) arrives on the bottom plage 9. Above the bottom plate a holding member 11 is movable between a retracted position of FIG. 1 and a holding position of FIG. 2. In the holding position one or more rows of bags on the bottom plate are prevented from tilting in the direction of the erector 6. The holding member 11 is actuated by a pneumatic cylinder 10. The movements of the erector 6 and the holding member 11 from the position of FIG. 1 to the position of FIG. 2 and reverse are synchronized.

To prevent a row of bags from tilting in the direction turned away from the erector 6, a back plate 12 is mounted opposite to the erector 6. This back plate 12 is connected with the front plate 14 of this piston rod of a pneumatic cylinder 15 by one or more springs 13. A stop member 16 is mounted on the front plate 14.

As soon as a row of bags is moved by the erector from the inclined to the vertical position, as shown in FIG. 3, which takes place directly after that row has slid to the bottom plate 9, the back plate 12 will be pushed away by the action of spring 13 and will touch the stop member 16, by which a signal is given. As a consequence thereof the piston of the cylinder 15 is retracted until the back plate 12 is free from the stop member 16. The back plate 12 will have been retracted then along the thickness dimension of a bag.

Figure 4:
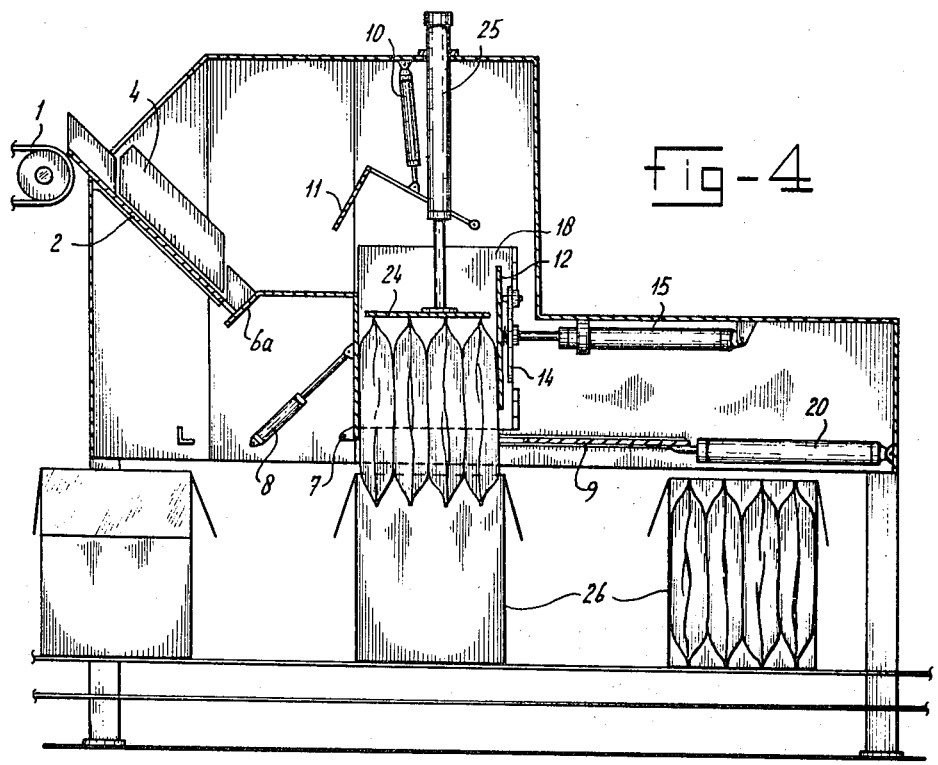
FIG. 4 shows a corresponding vertical cross-section during the transfering of a layer into a case.
Figure 5:
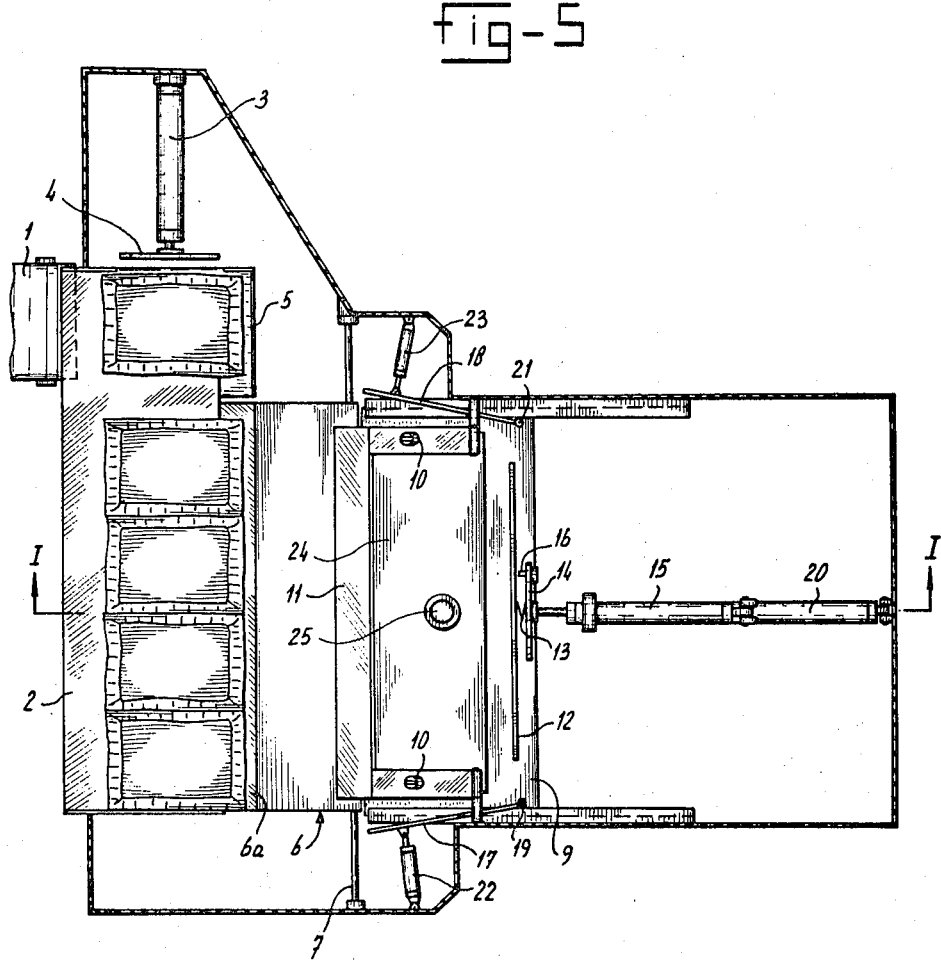
FIG. 5 shows a plan view of the machine partially in horizontal cross section.

The number of times the erector is erected, is counted. As soon as a certain number of erection movements (corresponding to the desired number of rows in a layer) is carried out, a signal is given to an actuating device of a pneumatic cylinder 20 to move the bottom plate 9 from the supporting position of the FIGS. 1, 2 and 3 to the retracted position of FIG. 4.

At both sides of the horizontal bottom plate 9 vertical side plates 17, 18 are mounted which are pivotable respectively about vertical axes 19, 21 and which may be pivoted by means of pneumatic cylinders 22 and 23.

When obtaining the desired number of rows (in the figure four rows) in a layer, not only cylinder 16 is actuated, but also cylinders 22, 23 are actuated to pivot the side plates to a position in which they are perpendicular to the back plate 12. The layer of bags is now locked up at four sides namely between the erector 6 and the back plate 12 and between the side plates 17 and 18.

The locked up layer is pushed by a pushing plate 24 to a case 26 positioned below it. The pushing plate 24 is actuated by a pneumatic cylinder 25 which receives an actuating signal as soon as the bottom plate is retracted and the side plates 17, 18 are moved in a position perpendicular to the back plate 12.

Preferably the apparatus is used in combination with the device to remove leak bags, such as described in U.S. Pat. No. 4,148,213.

Within the scope of the claims different modifications are possible. Obviously the pneumatic cylinders may be replaced by hydraulic cylinders. Instead of making use of the pushing plate 4 with the cylinder 3, there is a possibility to let the conveyor 1 move stepwise along plate 2.

Figure 6:
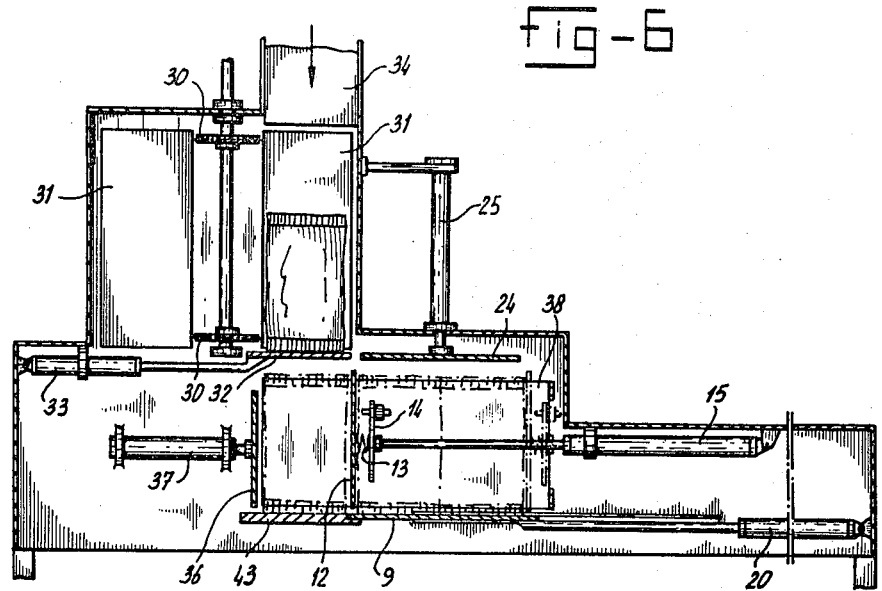
FIG. 6 shows a vertical cross section of an alternative machine.
Figure 7:
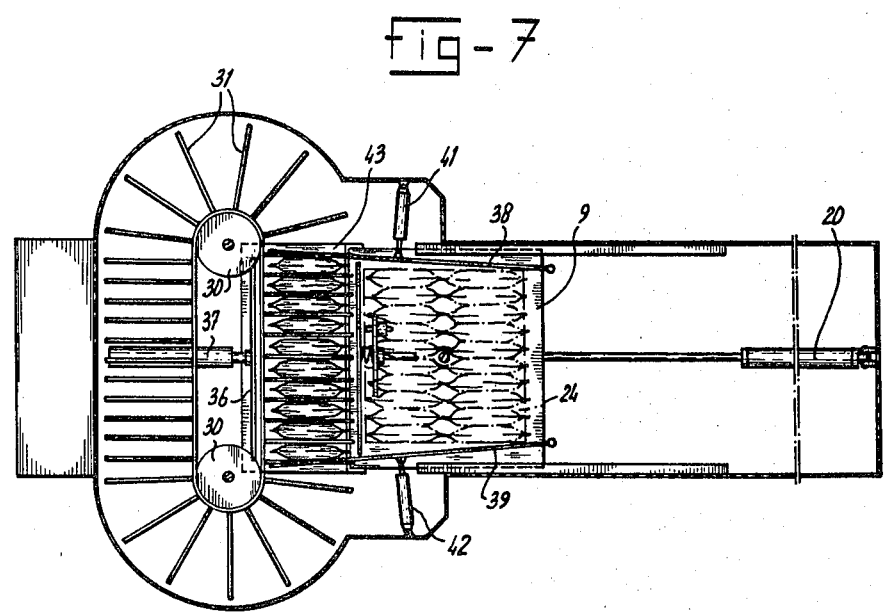
FIG. 7 shows a plan view of the apparatus according to FIG. 6.

FIGS. 6 and 7 show an alternative device of a system for arranging the bags into a row and transfering each row to the bottom plate. The system comprises two horizontal endless chains 30 one above the other. Vertical carrier plates 31 are connected to these chains. The support for temporary supporting the bags which are collected to form a row, consists of a plate 32 which may be moved backwards and forwards by a pneumatic cylinder 33. The vertical feeding pipe for the bags is indicated by 34. The supplied bags are turned 90° with respect to the position which they take in the embodiment according to FIGS. 1-5.

The stepwise movement of chains 30 is synchronized. After each step a bag drops between two carrier plates 31. After the required number of bags is collected on plate 32 to form a row, this plate is retracted so that the row of bags drops on the fixed bottom 43. The side plates 38.39 which may be compared with plates 17, 18 of the embodiment according to FIGS. 1-5 extend along such a distance that they protude along the row of bags dropped on the bottom plate. They may be actuated by cylinders 41, 42 respectively.

Next the bags are displaced along the width dimension of a bag over the fixed bottom 43 onto the movable bottom plate 9 by means of the pushing plate 36 actuated by cylinder 37. The bags will be pushed closer to each other by means of plates 38, 39. The remaining part of the device is substantially equal to the apparatus according to FIGS. 1-5, so that no further explanation is necessary.

What is claimed is:

1. An apparatus for packaging product-filled sealed bags in an upright position in packing cases comprising:
    means for arranging a predetermined number of bags in a row;
    a movable bottom plate capable of supporting at least one row accumulated thereon;
    means for delivering the row from the arranging means to the bottom plate;
    means for positioning the row in an upright position on the bottom plate;
    means for supporting the row on the bottom plate in the upright position by applying a lateral gripping force to opposite sides of the row;
    means for moving the bottom plate to a non-supporting position after the row has been gripped; and
    a vertically movable pushing plate operable to push the row in its upright position downwardly into an open, underlying packing case after the bottom plate is moved to its non-supporting position.

2. An apparatus according to claim 1 wherein the bags are delivered to the arranging means one at a time by a single channel conveyor, the arranging means including an inclined plate onto which the bags are delivered and a power-operated pushing plate extendable along the inclined plate successively to position each bag along the inclined plate to form the row of bags closely adjacent one another.

3. An apparatus according to claim 1 wherein the arranging means includes an inclined plate onto which the bags are delivered one at a time from a conveyor, the delivering means and positioning means including a common member pivotable from a holding position in which one surface thereof supports the bags on the inclined plate and another surface thereof forms part of the supporting means adapted to support one side of a row on the bottom plate, to a retracted position in which the row formed on the inclined plate is free to slide downwardly onto the bottom plate.

4. An apparatus according to claim 1 wherein the supporting means includes a power-operated back plate movable in a horizontal direction laterally to support one side of a row on the bottom plate, and means for retracting the back plate incrementally away from the positioning means a distance approximating the thickness of a row when an additional row is positioned on the bottom plate, thereby to maintain a substantially constant gripping force on the accumulated group of rows.

5. An apparatus according to claim 4 wherein the retracting means comprises a cylinder means mounted at one end to a frame of the apparatus and having at its other end a piston rod attachment resiliently connected to the back plate, and a stop member carried by the attachment which contacts the back plate when the additional row is positioned on the bottom plate, thereby to generate an actuating signal causing the piston rod attachment and connected back plate to be retracted.

6. An apparatus according to claim 1 wherein the arranging means includes at least one horizontal endless chain provided with vertical carrier plates defining stalls for supporting an upright bag therebetween and a feeding pipe having an opening above the stalls through which bags are fed.

7. An apparatus according to claim 1 wherein the arranging means includes a plurality of vertical carrier plates defining stalls therebetween, a feeding pipe above the stalls through which bags may be introduced one at a time into a stall, means for moving the feeding pipe and stalls relative to each other to enable a predetermined number of bags to be introduced into adjacent stalls to form a row, and a retractable plate underneath the stalls to support the bags thereon.

* * * * *